United States Patent [19]

Pines et al.

[11] 4,283,519

[45] Aug. 11, 1981

[54] ORGANOSILICONE TERPOLYMERS

[75] Inventors: Arthur N. Pines, Katonah; Gordon C. Johnson, Armonk; Fannie L. Campbell, Briarcliff Manor, all of N.Y.

[73] Assignee: Union Carbide Corporation, New York, N.Y.

[21] Appl. No.: 105,708

[22] Filed: Dec. 20, 1979

[51] Int. Cl.³ .......................... B05D 3/02; B32B 7/00; C08G 77/04
[52] U.S. Cl. ..................................... 528/26; 427/387; 427/389.9; 427/393.2; 428/266; 428/289; 428/290
[58] Field of Search .................. 427/387, 389.9, 393.2; 428/447, 452, 474, 480, 266, 289, 290; 528/25, 26, 29, 32

[56] References Cited

U.S. PATENT DOCUMENTS

| | | | |
|---|---|---|---|
| 3,511,699 | 5/1970 | Johnson et al. | 428/264 |
| 3,565,845 | 2/1971 | Johnson | 528/25 X |
| 3,992,332 | 11/1976 | Zenon | 252/8.9 X |
| 4,184,004 | 1/1980 | Pines et al. | 427/387 X |

*Primary Examiner*—Michael R. Lusignan
*Attorney, Agent, or Firm*—Richard J. Gallagher

[57] ABSTRACT

Organosilicone terpolymer containing a plurality of pendant polyoxyalkylene groups and a plurality of pendant hydroylzable silyl groups is employed as a hydrophilic finish agent for natural and synthetic textile fabrics.

4 Claims, No Drawings

ORGANOSILICONE TERPOLYMERS

CROSS-REFERENCE TO RELATED APPLICATION

Pines et al. application Ser. No. 899,103, filed on Apr. 21, 1978, now U.S. Pat. No. 4,184,004, patented Jan. 15, 1980, describes the treatment of textile materials with organosilicone terpolymers from which those presently claimed differ in the moiety identified herein as D''.

BACKGROUND OF THE INVENTION

1. Field of the Invention

This invention relates to organosilicone terpolymers per se, to their employment as finishing agents for natural and synthetic textiles, and to textile materials embodying them.

2. Description of the Prior Art

The application of finishing agents to textiles has been practiced for many years. Textile fabrics treated with durable press resin require treatment with softening agents to achieve commercially acceptable hand, strength, and wrinkle recovery.

A number of silicone compounds have been employed as softening agents in the prior art. Usually, these are silicone fluids which are applied in the form of emulsions. They impart a soft feel to the fabric, improve processibility, and are generally more efficient to use than the available organic softening agents.

In some instances, the silicone fluids contain reactive groups which cause them to crosslink on the fabric, resulting in a highly durable finish.

One such reactive silicone softening agent is an epoxy-modified polydimethyl-siloxane which is described in U.S. Pat. No. 3,511,699. Other softening agents are two-component systems comprised of silanol endblocked silicone oil emulsions and alkoxysilanes such as methyl trimethoxysilane crosslinker. The two components are premixed immediately prior to their application to the fabric.

The above mentioned reactive silicone fluids which are employed as softening agents and which impart durable softness, are hydrophobic in nature. Hydrophobicity is undesirable in many textile applications because it contributes to fabric soiling and it is believed to inhibit washing effectiveness. Moreover, the hydrophobicity of these softening agents inhibits the absorption of body moisture in clothing fabrics, and thus can cause the wearer to experience a damp sensation.

U.S. Pat. No. 3,565,845 describes siloxane-polyoxyalkylene block copolymers which are capable of forming durable finish on fibrous materials treated therewith. Silicone glycol nonionic type copolymers which are hydrophilic, such as those described in U.S. Pat. No. 3,992,332, can be blended with anionic phosphate esters and employed as a softening agent in fabric laundering. But these hydrophilic softeners are non-crosslinking. Consequently, the softness which they impart is not highly durable and the softener must be applied in subsequent launderings.

The textile art is seeking an effective softening treatment which is at once highly permanent, hydrophilic, and economical to use.

SUMMARY OF THE INVENTION

This invention provides novel finished textile materials and methods for imparting a soft, hydrophilic finish thereto. The textile treatment of this invention can be used alone or in conjunction with other known treatments, such as the application of durable press resins.

The treatment of this invention involves applying to textile fabrics at least a softening amount of a hydrophilic organosilicone terpolymer which contains a plurality of pendent polyoxyalkylene groups and a plurality of pendent hydrolyzable silyl groups, as described in more detail hereinafter. The organosilicone terpolymer is applied to the textile fabric under hydrolysis conditions and cured under conditions which cause the organosilicone terpolymer to condense, thus forming a crosslinked network on the textile. In some instances, such as where the textile fabric being treated contains hydroxyl groups, e.g. cotton, the organosilicone terpolymer may also react with the fabric itself and bond directly thereto.

DETAILED DESCRIPTION OF THE INVENTION

The hydrophilic organosilicone softening agent of this invention is described by the general formula:

$$MD_xD'_yD''_zM \quad \text{(I)}$$

wherein M, in each occurrence, is an end-capping unit of the formula $A_3SiO_{\frac{1}{2}}$ in which A, individually, is a monovalent organic radical free of olefinic unsaturation, such as a monovalent hydrocarbon radical, preferably alkyl having from 1 to 13 carbon atoms, a hydrocarbyloxy in which the hydrocarbyl moiety is free of olefinic unsaturation and is preferably alkoxy containing from 1 to 13 carbon atoms, or a hydroxyl-terminated radical which is bonded to the silicon atom through a 1 to 13 carbon chain; or A is hydroxyl bonded directly to the silicon atom; or M can be—in one or both occurrences—alkoxy of 1 to about 13 carbon atoms.

In formula I, above D represents a unit of the formula $R_2SiO$ wherein R, in each occurrence, is a monovalent hydrocarbon radical free of acetylenic unsaturation. Illustrative of the monovalent radicals represented by R one can mention alkyl groups containing from 1 to 10 carbon atoms such as methyl, ethyl, propyl, butyl, isobutyl, amyl, hexyl, octyl, and decyl; alkenyl groups such as butenyl, butadienyl, pentenyl, and the like; aryl radicals, including fused ring structures, such as phenyl, p-phenylphenyl, naphthyl, anthryl, and the like; aralkyl radicals such as phenylmethyl and phenylcyclohexyl; alkaryl radicals such as tolyl, xylyl, ethylphenyl, or β-methylnaphthyl, and the like; and cycoalkyl radicals such as cyclopentyl, cyclohexyl, and cyclobutyl. Preferred R radicals are alkyl, with methyl being particularly preferred.

In formula I, above, D' represents a unit of the formula RR'SiO wherein R has the same meaning as stated in the definition of D, above, and R' is a polyoxyalkylene unit of the formula $$-C_nH_{2n}(OC_2H_4)_a(OC_3H_6)_bOR'' \quad \text{(II)}$$

wherein n is an integer having an average value of 3 to 8; R'' is hydrogen, acyl of 1 to 8 carbon atoms, or a monovalent hydrocarbon radical from 1 to 13 carbon atoms which is free from olefinic unsaturation; and a and b are integers such that the sum of a+b is at least 3 and can be up to about 200, and the quantity a÷(a+b) has a value of from 0 to 1.0. In formula II, above, the oxyethylene and oxypropylene moieties can be linked in a random chain or in a block type chain such as a block structure of AB or ABA type, or in a chain having both blocked and random sections.

In formula I, above, D" represents a unit of this formula

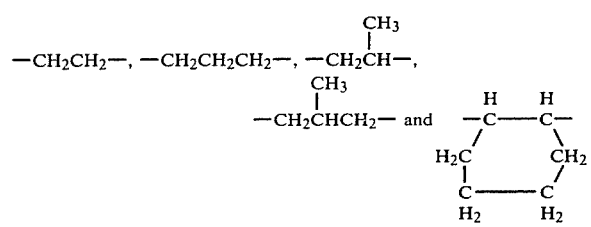

wherein R has the same meaning as stated in the definition of D, above, L is a divalent aliphatic hydrocarbon radical, preferably having up to 6 carbon atoms, which is free of unsaturation, and which separates the silicon atoms by at least 2 carbon atoms, such as $$-CH_2CH_2-, -CH_2CH_2CH_2-, -CH_2CH-,$$
$$\begin{array}{c} CH_3 \\ | \\ CH_3 \end{array}$$
$$-CH_2CHCH_2- \text{ and }$$

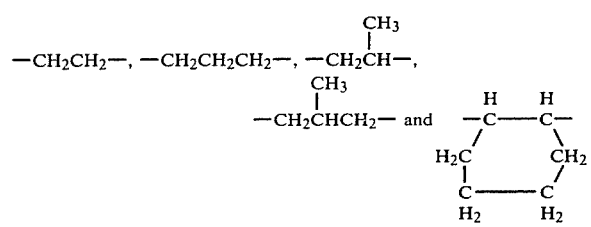
(second structure — cyclic)

R"" is alkyl of 1 to 8 carbon atoms; X is hydroxyl or a hydrolyzable group; (i.e. one which is hydrolyzed by water to produce hydroxyl) and m is 2, 1, or 0. Suitable hydrolyzable groups representative of X include alkoxy of 1 to about 8 carbon atoms, alkoxyalkoxy having up to about 8 carbon atoms, acyloxy having up to about 8 carbon atoms, halogen such as chlorine, fluorine, and bromine, dialkylamine, phenoxy, and oxime.

Because of the ready availability of precursors and the excellent results obtained using the final product the preferred M and D units of formula I are, respectively, $(CH_3)_3SiO_{\frac{1}{2}}$ and $(CH_3)_2SiO$ and the preferred D" units are $$\begin{array}{c} (CH_3)SiC_2H_4Si(OCH_3)_3 \\ | \\ O \end{array}$$

In formula I, above, x, y and z are each integers having the following values:
x = 25 to 500
y = 1 to 2x
z = 1 to 2x
Preferred values for x, y, and z are;
x = 50 to 300
y = 1 to 0.1x
z = 1 to 0.1x The organosilicones of formula I can readily be prepared, among other methods, by the platinum catalyzed addition of an ethylenically unsaturated polyoxyalkylene compound and an ethylenically unsaturated compound containing a hydrolyzable silyl group to hydrosiloxanes, the ratio of the reactants being such as to prevent the presence of unreacted, i.e. residual, hydrosiloxane moieties. It is to be understood, however, that trace hydrosiloxane contamination in the organosilicone can be tolerated without unduly affecting the products and processes of this invention, but preferably the organosilicone is hydrosiloxane free.

Preferably, the organosilicone terpolymer employed, as characterized by formula I, is an essentially linear polymer. If desired, however, the polymer may contain a degree of branching. In such a case, the polymer may contain, in addition to the units shown in formula I, up to about 10%, based on the total moles of M, D, D', and D" units, units of the formula $R^vSiO_{3/2}$ wherein each $R^v$, individually, can be any of the groups within the previously given definitions of R, R', R''', and R''''. Methods for introducing such groups (i.e. $R^vSiO_{3/2}$) into the terpolymer are well known to those skilled in the silicone art. As the skilled worker will also appreciate, for each mole of units $R^vSiO_{3/2}$ present, there must also be present in the polymer an additional mole of end-capping units M.

Typically, the hydrosiloxane precursor employed in the production of the organosilicone terpolymer has the formula $$MD_x(SiO)_{(y+z)}M,$$
$$\begin{array}{c} CH_3 \\ | \\ H \end{array}$$

the ethylenically unsaturated polyoxyalkylene has the formula $$CH_2=CHCH_2(OC_2H_4)_a(OC_3H_6)_bOCH_3,$$

and the ethylenically unsaturated compound containing a hydrolyzable silyl group has the formula $$CH_2=CHSi(OCH_3)_3,$$

wherein M, D, x, y, z, a, and b have the hereinbefore defined meanings.

The ethylenically unsaturated polyoxyalkylene compound and the ethylenically unsaturated compound containing a hydrolyzable silyl group can be reacted with the hydrosiloxane simultaneously or sequentially. If they are sequentially reacted, care must be taken that the first unsaturated compound reacted with the hydrosiloxane is employed in less than stoichiometric equivalence to the number of SiH groups, so that a sufficient number of unreacted SiH groups remain as grafting sites for the desired amount of the later reacted unsaturated compound.

A catalytically effective amount of chloroplatinic acid, a platinum complex, or platinum on a support are suitable catalysts for the foregoing reaction. Typically, an amount of such catalyst sufficient to provide from about 5 to 50 p.p.m of platinum, based on the weight of the reactants, is effective. Other hydrosilation catalysts known to those skilled in the art may be employed in the usual catalytically effective concentrations. The reaction can be carried out in a conventional chemically inert solvent and product recovery is by conventional means.

The hydrosiloxanes which are employed in the production of the organosiloxane softening agents of this invention are well known in the art, as are the methods for their preparation.

The method of application of the organosilicone to the textile being treated in any of those conventional in the art for applying other finishing agents. The textile material can be suitably treated by immersing it in a treating bath which is a solution, dispersion, or emulsion containing the organosilicone terpolymer. Excess solution can then be removed from the textile material (e.g. by padding). Other methods of treatment include spraying or transfer coating.

It is preferred to employ organosilicone terpolymers as described above which are soluble in water. Generally, water solubility is enhanced by increasing the weight ratio of polyoxyalkylene groups (i.e. formula II above) to the silicone backbone in the molecule and by increasing the value of a÷(a+b). For selective performance and for a÷(a+b) ratios resulting in a water insoluble polymer, the silicone can be dispersed in water with the aid of surfactants. Suitable treating solutions or dispersions (baths) can contain a diluent and from 0.01 to 10 parts by weight of the above described organosilicone terpolymer per 100 parts by weight of the diluent. The organosilicone terpolymer is applied under hydrolysis conditions; that is, conditions under which hydrolyzable groups bonded to the pendant silicon (e.g. alkoxy) are replaced by hydroxyl. Hydrolysis conditions are normally provided by employing water as the diluent in the treating bath. By employing water as the diluent, the treatment of this invention is compatible with other textile treating operations which are normally carried out in aqueous media. If desired, however, other diluents can be employed such as glycol ethers, hydrocarbons, and aqueous solvents. It has been found that the organosilicone terpolymers employed as softening agents in the process of this invention form aqueous treating baths having shear stability which is generally superior to that of treating baths which employ the hydrophobic silicone softeners known in the prior art.

In the process of this invention, the amount of organosilicone terpolymer which is applied to the textile material can vary depending on such factors as the desired properties of the final product, economic considerations, compatibility factors, etc. Generally, it is desired the textile material be treated with from 0.01 to 10 parts by weight of the organosilicone terpolymer per 100 parts of textile material. Preferably, the textile material is treated with from 0.05 to 5.0 parts by weight per 100 parts by weight of textile material.

The organosilicone terpolymer which has been applied to the textile material is cured by condensation. Preferably, curing is effected by heating the treated textile material at a temperature from about 110° C. to any temperature below that which will adversely affect the particular textile material being treated; however, 200° C.–225° C., depending upon the residence time, is a practical upper limit. If desired, a catalyst can be employed to accelerate curing.

Suitable cure catalysts include metal salts such as zinc nitrate, aluminum sulfate, zirconium acetate, magnesium chloride, zinc 2-ethylhexoate, and dibutyltin dilaurate. Such catalysts are generally employed at a concentration of 0.1 to 10 parts by weight metal to 100 parts by weight organosilicone.

Any natural or synthetic textile material can be treated by the process of this invention, for example, cotton, polyester, wool, nylon, polypropylene, acrylic, rayon, silk, etc. or blends of these. Due to the hydrophilic nature of the softening agent used in this invention, the textile materials which derive the greatest benefits from the treatment, in terms of improved launderability and soil release properties, are those which are from inherently hydrophobic fibers (e.g. polyester or nylon) or which have been treated with a hydrophobic substance (e.g., certain durable press resins).

In one embodiment of this invention, treatment of the textile material with the organosilicone terpolymer softening agent and treatment with a durable press resin (also known as a "creaseproofing agent" or "textile resin") are carried out together, i.e. in the same bath.

The durable press resins are known in the art and include aminoplast resins, epoxides, aldehyde, aldehyde derivatives, sulfones, and sulfoxides. Aminoplasts are preferred durable press resins as they are relatively inexpensive. Suitable durable press agents are disclosed in "Creaseproofing Resins for Wash-and-Wear Finishing" by A. C. Nuessle, Textile Industries, Oct. 1959, pp. 1–12.

Typical aminoplast durable press resins include the urea-formaldehyde condensates, e.g. methylolated ureas and alkyl ureas, etc.,; melamine-formaldehyde condensates, e.g. tri, tetra and penta methylol and methoxymethyl melamines, etc.; alkylene ureas, e.g., dimethylol ethylene or propylene urea, dihydroxydimethylol ethylene urea and various alkoxymethyl derivatives thereof, etc.; carbamates, e.g. dimethylol alkyl and alkoxyalkyl carbamates, etc.; formaldehyde-acrolein condensation products, formaldehyde-acetone condensation products; alkylol amides, e.g. methylol formamide, methylol acetamide, etc.; alkylol acrylamides, e.g. N-methylol methacrylamide, N-methylol-N-methylacrylamide. N-methylol methylene-bis (acrylamides), methylene-bis (N-methylol acrylamide), etc.; diureas, e.g. trimethylol and tetramethylol acetylene diureas, etc.; triazones, e.g. dimethyl N-ethyltriazone, N N'-ethylenebis(di-methylol triazone), etc., urons, e.g. dialkoxymethyluron, etc., and the like.

Typical epoxide durable press resins include the diglycidyl ethers of polyols such as ethylene glycol diglycidyl ether and diepoxides such as vinyl cyclohexane dioxide. Typical aldehyde creaseproofing agents include formaldehyde, glyoxal, glutaraldehyde, and alpha-hydroxyadipaldehyde. Typical aldehyde derivative creaseproofing agents include 2,4,6-trimethylol phenol, tetramethylol acetone, diethylene glycol acetal and pentaerythritol bis acetal.

When the durable press resin and organosilicone terpolymer softening agent are applied to the textile material from a single bath, a cure catalyst for the durable press resin is generally employed. The choice of catalyst is governed by the particular durable press resin. By way of illustration, catalysts such as magnesium chloride, zinc chloride, zinc nitrate and amine hydrochlorides can be used with aminoplasts; catalysts such as hydrochloric acid can be used with aldehydes; alkaline catalysts can be used with aldehyde derivatives; and catalysts such as sodium hydroxide can be used with sulfones. The cure of the durable press resin is usually effected at an elevated temperature (e.g. from 120° C. to 255° C.) and the durable press resin and organosilicone terpolymer softening agent can conveniently be simultaneously cured.

This silicone can also be used with latexes, such as those based upon acrylic acid and esters, and other polymeric finishes such as those containing polycarboxyl groups or polyhydroxyl compounds.

This treatment of this invention can be employed in conjunction with any other treating steps and treating materials which are conventionally employed in the textile finishing art. The silicone finish can be applied without the use of other "resins" or can be used as a top finish. It can also be applied alone or in combination with other surfactants, lubricants, and antistats to synthetic textile at the time of spinning or processing or to natural fibers during carding.

The following examples are intended to further illustrate the invention which is described above and are not intended to unduly limit the scope of the invention.

Unless otherwise indicated all parts and percentages are by weight in the examples.

In the examples the following procedures were used to test for the indicated properties.

| Property | Procedure |
| --- | --- |
| Wettability | Textile sample is stretched over a 6-inch embroidery hoop. A drop of water is placed on the surface. Using a stopwatch, the time in seconds for wetting to begin and the time for the drop to be completely absorbed is noted. |
| Shear stability of durable press bath | (a) A 10-ml. buret is filled with a solution containing 1,000 p.p.m silicon per ml. (certified atomic absorption standard silicon reference solution, Fisher Scientific Co.) Standard solutions are prepared to correspond to anticipated high and low ranges of silicon plus one or two points in between by diluting the proper volume of reference solution with distilled water. |
|  | (b) A 100-ml. volumetric flask is filled with 70–80 ml. of distilled water, 1 ml. of durable press bath is transferred to the flask, and the flask is filled to the 100-ml. mark with distilled water and mixed thoroughly. |
|  | (c) The durable press bath is placed in the mixing jar of a Waring blender (model No. 91263) and sheared for 5 minutes at 12,000 r.p.m (12,000 r.p.m. is obtained using a variac power controller and low speed setting on the blender). |
|  | (d) A 1-ml. sample from the bottom of the sheared bath is removed and the sample is diluted to 100 ml. with distilled water and mixed thoroughly. |
|  | (e) Silicon content of the sheared (from d) and unsheared (from b) samples are determined by atomic absorption spectrophotometer. Shear Stability Index is reported as the ratio of p.p.m. silicon in the sheared sample to that in the unsheared sample. |
| Wt. % Silicon in Fabric | Sample of treated fabric is charred with fuming $H_2SO_4$. Residue is treated with ammonium molybdate which generates yellow characteristics of silicon molybdate. Silicon content is determined by measuring color intensity using a spectrophotometer. |
| Wt. % Silicon in organo- silicone terpolymer | Sample is treated with $H_2SO_4$, leaving a silica residue which is weighed. The residue is treated with HF, which volatilizes the silica. Any remaining residue is weighed and the silicon content is calculated from the weight loss. |

EXAMPLES 1–2

To a flask fitted with a thermometer, nitrogen inlet tube, reflux condenser, and heating mantle there were charged 53.6 g. toluene; 123.7 g of $CH_2=CHCH_2(OC_2H_4)_{23}(OC_3H_6)_{26.1}OMe$; 2.65 g of $CH_2=CH\ Si(OCH_3)_3$; and 52.64 g of a hydrosiloxane having the average formula

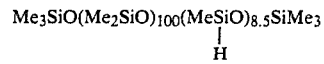

The reactants were heated to 85° C. with nitrogen purging through the head space. There were then added 50 p.p.m Pt as chloroplatinic acid in dimethoxyethane. The reaction initiated; the temperature rose to 88° C. Heating was continued for 1 hr. at 95° C. The reaction product was then neutralized by treatment with $NaHCO_3$ overnight, filtered through a 2 micron pressure pad and stripped of solvent at 70° C. under 0.5 mm Hg pressure. The product, identified as Organosilicone I, had a viscosity of 10,550 cps. at 20° C., was water soluble (3% in water at room temperature), an index of refraction ($n_D^{25}$) of 1.4422 and a silicon content of 11.12%.

Another organosilicone was produced by a similar procedure except that 3.40 g. of $CH_2=CHSi(OCH_2CH_3)_3$ were substituted for the $CH_2=CHSi(OCH_3)_3$. The organosilicone, identified as Organosilicone II, was also water soluble, had a viscosity of 9,500 cps at 20° C., an index of refraction of 1.4423 and a silicon content of 10.99%.

Each of the organosilicone terpolymers produced as described above was performance-tested on fabric samples consisting of 50/50 polyester/cotton. The performance data is presented below:

| Organosilicone | I | II | Control* |
| --- | --- | --- | --- |
| Wettability (sec.) | 7 | 2 | >300 |
| Shear Stability (ppm Si ratio) | 1.000 | 1.000 | 0.862 |
| Durability (% remaining in fabric after washing) | 79 | 55 | 38 |

*UCARSIL TE-24, a commercial fabric softener

The performance data indicates an excellent degree of durability as well as facile wettability.

In another experiment, wettabilities were determined in a variety of fabrics, untreated and treated with the indicated fabric softening agents (results are given in seconds):

|  | 100% Cotton | 100% Wool | 100% Nylon | 100% Polyester(P.E.) | 50/50 P.E./Cot |
| --- | --- | --- | --- | --- | --- |
| Untreated | <2 | >300 | 148 | >300 | 19 |
| Organosilicone I | <2 | instant | 100 | 268 | <2 |
| Organosilicone II | instant | instant | 26 | 145 | instant |
| Control* | 50 | >300 | 83 | >210 | 147 |

*UCARSIL TE-24, a commercial fabric softener

EXAMPLES 3–11

In a manner similar to that described above for the preparation of Organosilicone I, the following organosilicone terpolymers of the invention were prepared (Me represents methyl):

| No. |  |
| --- | --- |
| 3 | $CH_2CH_2Si(OMe)_3$<br>\|<br>$Me_3SiO(Me_2SiO)_{100}(MeSiO)_5(MeSiO)_2SiMe_3$<br>\|<br>$CH_2CH_2CH_2(OC_2H_4)_{12.7}(OC_3H_6)_{14.5}OMe$ |

-continued

| No. | |
|---|---|
| 4 | CH₂CH₂Si(OMe)₃<br>\|<br>Me₃SiO(Me₂SiO)₁₀₀(MeSiO)₁₀(MeSiO)₂SiMe₃<br>\|<br>CH₂CH₂CH₂(OC₂H₄)₁₂.₇(OC₃H₆)₁₄.₅OMe |
| 5 | CH₂CH₂Si(OMe)₃<br>\|<br>Me₃SiO(Me₂SiO)₁₀₀(MeSiO)₅(MeSiO)₅SiMe₃<br>\|<br>CH₂CH₂CH₂(OC₂H₄)₁₂.₇(OC₃H₆)₁₄.₅OMe |
| 6 | CH₂CH₂Si(OMe)₃<br>\|<br>Me₃SiO(Me₂SiO)₁₀₀(MeSiO)₁₀(MeSiO)₅SiMe₃<br>\|<br>CH₂CH₂CH₂(OC₂H₄)₁₂.₇(OC₃H₆)₁₄.₅OMe |
| 7 | CH₂CH₂Si(OMe)₃<br>\|<br>Me₃SiO(Me₂SiO)₁₀₀(MeSiO)₅(MeSiO)₂SiMe₃<br>\|<br>CH₂CH₂CH₂(OC₂H₄)₃₄.₅(OC₃H₆)₃₉.₃OMe |
| 8 | CH₂CH₂Si(OMe)₃<br>\|<br>Me₃SiO(Me₂SiO)₁₀₀(MeSiO)₅(MeSiO)₂SiMe₃<br>\|<br>CH₂CH₂CH₂(OC₂H₄)₃₄.₅(OC₃H₆)₃₉.₃OMe |
| 9 | CH₂CH₂Si(OMe)₃<br>\|<br>Me₃SiO(Me₂SiO)₁₀₀(MeSiO)₅(MeSiO)₅SiMe₃<br>\|<br>CH₂CH₂CH₂(OC₂H₄)₃₄.₅(OC₃H₆)₃₉.₃OMe |
| 10 | CH₂CH₂Si(OMe)₃<br>\|<br>Me₃SiO(Me₂SiO)₁₀₀(MeSiO)₁₀(MeSiO)₅SiMe₃<br>\|<br>CH₂CH₂CH₂(OC₂H₄)₃₄.₅(OC₃H₆)₃₉.₃OMe |
| 11 | CH₂CH₂Si(OMe)₃<br>\|<br>Me₃SiO(Me₂SiO)₁₀₀(MeSiO)₇.₅(MeSiO)₃.₅SiMe<br>\|<br>CH₂CH₂CH₂(OC₂H₄)₂₃.₆(OC₃H₆)₂₆.₉OMe |

Their properties are summarized below:

| No. | Viscosity centipoise | $n_D^{25}$ | weight % Si Calculated | Found | Solubility* |
|---|---|---|---|---|---|
| 3 | 1100 | 1.4340 | 16.5 | 16.56 | D |
| 4 | 1000 | 1.4420 | 11.0 | 11.1 | Sl H |
| 5 | 900 | 1.4340 | 16.3 | 16.54 | D |
| 6 | 900 | 1.4415 | 11.3 | 11.1 | Sl H |
| 7 | 36000 | 1.4475 | 6.9 | 7.11 | S |
| 8 | 7000 | 1.4520 | 4.0 | 4.07 | S |
| 9 | 22000 | 1.4475 | 7.0 | 7.21 | S |
| 10 | 6000 | 1.4516 | 4.0 | 4.37 | S |
| 11 | 3200 | 1.4458 | 8.1 | 8.10 | S |

*2 wt % water solubility:
D = dispersible,
Sl H = slightly hazy,
S = soluble.

EXAMPLE 12-14

In a manner similar to that described above for the preparation of Organosilicone I, the following organosilicone terpolymers of the invention were prepared (Me represents methyl):

12
$$\text{Me}_3\text{SiO}(\text{Me}_2\text{Si})_{100}(\text{MeSiO})_{7.5}(\text{MeSiO})_{3.5}\text{SiMe}_3$$
with pendant groups:
CH₂CH₂Si(OMe)₂ (with Me)
CH₂CH₂CH₂(OC₂H₄)₂₃.₆(OC₃H₆)₂₆.₉OMe 13
$$\text{Me}_3\text{SiO}(\text{Me}_2\text{SiO})_{100}(\text{MeSiO})_{7.5}(\text{MeSiO})_{3.5}\text{SiMe}_3$$
with pendant groups:
CH₂CH₂SiOMe (with Me)
CH₂CH₂CH₂(OC₂H₄)₂₃.₆(OC₃H₆)₂₆.₉OMe 14
$$\text{Me}_3\text{SiO}(\text{Me}_2\text{SiO})_{100}(\text{MeSiO})_{7.5}(\text{MeSiO})_{3.5}$$
with pendant groups:
CH₂CH₂Si(OC₂H₅)₃
CH₂CH₂CH₂(OC₂H₄)₂₃.₆(OC₃H₆)₂₆.₉OMe Their viscosities in centipoises were respectively 3700, 5100, and 3700. Their refractive indices ($n_D^{25}$) were respectively 1.4464, 1.4463, and 1.4468. Their gel permeation chromatographic $E_v$'s were, respectively, 183.2, 183.1, and 182.9 milliliters, which indicates that all compositions have essentially the same molecular weight, since the solution volumes are the same within experimental error.

The foregoing examples are illustrative of the present invention. Other embodiments thereof will readily occur to those skilled in the art in view of the generic description of the invention presented above.

What is claimed is:

1. An organosilicone terpolymer of the formula $$MD_xD_y'D_z''M$$

wherein M, each occurrence, is a end-capping unit of the formula $A_3SiO_{\frac{1}{2}}$ in which A is a monovalent organic radical free of olefinic unsaturation or is hydroxyl bonded directly to the silicon atoms, or M is alkoxy of 1 to 13 carbon atoms, D is a unit of the formula R₂SiO wherein R is a monovalent hydrocarbon radical free of acetylenic unsaturation, D' is a unit of the formula RR'SiO wherein R is a monovalent hydrocarbon radical free of acetylenic unsaturation and R' is a polyoxyalkylene unit of the formula —C$_n$H$_{2n}$(OC₂H₄)$_a$(OC₃H₆)$_b$OR'' in which R'' is a hydrogen, acyl of 1 to 8 carbon atoms, or a monovalent hydrocarbon radical of 1 to 13 carbon atoms, n is an integer having an average value from 3 to 8, and a and b are such that the sum of a+b is from 5 to 200 and the quantity a÷(a+b) is from 0 to 1.0, D'' is a unit of the formula RR'''SiO wherein R is a monovalent hydrocarbon radical free of acetylenic unsaturation and R''' is a radical of the formula —L—SiR$_m$''''X$_{3-m}$ wherein L is a non-hydrolyzable aliphatic hydrocarbon linkage which separates the silicon atoms by at least two carbon atoms, R'''' is alkyl of up to 8 carbon atoms, X is hydroxyl or a hydrolyzable group, and m is 2, 1, or 0, and x is an integer from 25 to 500, y is an integer from 1 to 2x, and z is an integer from 1 to 2x.

2. An organosilicone terpolymer as in claim 1 wherein x is an integer from 50 to 300, y is an integer from 1 to 0.1x, and z is an integer from 1 to 0.1x.

3. An organosilicone terpolymer as in claim 2 wherein
M is (CH₃)₃SiO$_{\frac{1}{2}}$
D is (CH₃)₂SiO,
D' is CH₃R'SiO where in R' is a polyoxyalkylene unit of the formula —C₃H₆(OC₂H₄)$_a$(OC₃H₆)$_b$OCH₃ in which the sum of a+b is at least 20 and the quantity a÷(a+b) is from 0.3 to 0.75, and
D'' is CH₃R'''SiO wherein R''' is a radical of the formula —L—SiX₃ in which L is 1,2-ethylene or 1,3-propylene and X is methoxy or ethoxy.

4. An organosilicone terpolymer as in claim 3 wherein R' is a polyoxyalkylene unit of the formula —C₃H₆(OC₂H₄)₂₃(OC₃H₆)₂₆.₁OCH₃, R''' is a radical of the formula —CH₂CH₂Si(OCH₃)₃, x is 100, y is 6, and z is 2.5

* * * * *